Feb. 17, 1970   C. H. SNOW   3,495,436
CALIBRATION TEST STAND FOR AIRCRAFT CARGO HANDLING SYSTEM
Filed Nov. 14, 1966   2 Sheets-Sheet 1

INVENTOR.
CONLEY H. SNOW
BY
ATTORNEYS

Feb. 17, 1970     C. H. SNOW     3,495,436
CALIBRATION TEST STAND FOR AIRCRAFT CARGO HANDLING SYSTEM
Filed Nov. 14, 1966     2 Sheets-Sheet 2

INVENTOR.
CONLEY H. SNOW
BY
ATTORNEYS

United States Patent Office 3,495,436
Patented Feb. 17, 1970

3,495,436
CALIBRATION TEST STAND FOR AIRCRAFT CARGO HANDLING SYSTEM
Conley H. Snow, Royal Oak, Mich., assignor to Brooks & Perkins, Incorporated, Detroit, Mich., a corporation of Delaware
Filed Nov. 14, 1966, Ser. No. 594,092
Int. Cl. G01m 19/00
U.S. Cl. 73—1                                                9 Claims

ABSTRACT OF THE DISCLOSURE

An apparatus for calibrating a load responsive release mechanism such as employed in air cargo handling systems. Means are provided for imposing an increasing load upon the mechanism to be tested. A load responsive indicator responds to the imposed load to give an indication. Means are provided for checking the load responsive indicator with a calibrated load indicator.

---

The present invention relates to an improved calibration test stand or related equipment for the testing, maintenance, checking, re-setting, etc., of apparatus, instruments, and the like. More particularly, the equipment or device of the invention is intended to be employed in the re-calibration of load restraint latches or locks such as are employed in an aircraft cargo handling system of the type illustrated and described in a co-pending application of Mollon et al., Ser. No. 282,008, filed May 21, 1963, now Patent No. 3,335,983.

This system is characterized by two longitudinally extending series of locks for the releasable restraint of cargo supporting pallets or platforms within the elongated cargo space of a military aircraft or commercial transport, for example the U.S. Air Force C-130. One such series, extending along the left hand side of the cargo space, is operated by a load master for the sequential locking-up, from forward to aft, of the load pallets, and the sequential release from aft to forward of the pallet locks.

The second series of locks extends along the right-hand side of the aircraft, which locks are released under parachute drag in flight, once the left-hand locks have been freed; and the equipment or device of the invention is utilized in the accurate calibration or re-calibration of locks of the right-hand, parachute released type. However, it is to be understood that the principle underlying the improvement, which concerns the transmission of a multiplied, usually manually applied, force through an indicator instrument or related unit to a mechanism or unit to be tested, checked, performance-recorded, or the like, may also be incorporated in other equipment differing as to specific purpose from that herein illustrated and described.

Each of the right-hand locks is constructed to provide a variable aft restraining force on its particular lock pallet or platform, which force is pre-set on installation to a specific value corresponding to the gross weight of the load and the required parachute extraction force. For example, this aft force may be pre-set to range from 250–4,000 lbs. in 250 pound increments; and the lock is factory-calibrated to yield under parachute drag within a tolerance of ±5% at each lock setting.

A lock assembly which requires replacement of any major part, or is out of calibration for some reason after use, must be replaced, and the defective or inaccurate assembly then sent to a depot or returned to the factory for repair or replacement. This necessarily entails re-calibration; and it is the general object of the present invention to provide simple, sturdy and efficient equipment to perform this function.

In general, the improved calibration equipment or device comprises a housing of a sturdy and compact nature housing and mounting the operating parts of the calibrator, which housing may be mounted upon an appropriate test stand or other support and fixedly secured to the latter, if desired; however, the equipment is sufficiently light in weight to be readily portable from place to place and used without any special support.

The housing internally mounts a known type of force indicator cell, which cell is interposed in a line of force transmission originating at a manually operated force multiplying and applying unit or sub-assembly. The latter is of the general nature of a bell crank having short and long lever arms for the desired multiplication of force, this bell crank being driven by further force multiplying toothed and hand crank means; and the force is transmitted through the indicator cell to, a movable unit receiving a part of the mechanism to be calibrated or tested. In the present case the movable unit in question is a cage receiving the operated detent member of a latch or lock assembly secured to the housing of the calibrator and transmitting to that operated member the mechanical force transmitted through the force indicator cell.

Accordingly, an operator manipulating with little effort the hand crank of the force multiplying and applying unit may readily observe, at an indication appearing on a calibrated dial of the cell, the degree of force to which the lock detent is being subjected, as the operator progressively applies increasing force through the cell. He will also particularly observe the exact value of the force at which the detent member yields under the simulated parachute retraction force applied thereto. Should this force be observed to be greater or less than the intended retraction force for a given pallet load (i.e., be not within the percent tolerance limits mentioned above), the operator makes a simple adjustment of a pre-compression spring of the lock in order to bring its restraint action within the intended tolerance setting. The lock is then removed from the calibrator and returned to the field.

Further and more specifically, the device of the invention is characterized in that its force indicator cell is supported on a special, optionally swingable carriage unit or sub-assembly which is guided for rectilnear sliding movement in the line of force transmission, as a push rod of the cell acts on the detent-receiving cage; in that its force amplifying or multiplying and applying unit is a sub-assembly including an elongated hand operated crank external of the calibrator housing which crank is key-connected through a transverse shaft journaled in the housing to a drive pinion, the pinion operating a sector gear and the gear operating a short power output arm which completes force applying unit; and in that a pressure roller of the last-named unit acts directly upon a force-transmitting push rod of the force indicator cell. As indicated above, the force transmitted through the cell is applied directly to the detent of the lock through the agency of a cage mounted in the calibrator housing to slide on the line of force transmission. Thus, with the lock under calibration rigidly bolted to the housing of the device, its detent extending through a housing wall and into the cage, all forces are absorbed by the light-weight though rugged housing structure.

In still further accordance with the invention, provision is made to mount the carriage of the force indicator cell sub-assembly to swing in a transverse plane about an axis spaced transversely and downwardly of the normal line of force transmission through the cell, and through a special housing wall opening. The indicator cell carriage is provided, in addition to a push button element receiving force from the bell crank-type force applying means at said normal force transmission line, with another push rod element of a more elongated nature. Accordingly, with the carriage swung outwardly of the housing, the elongated force-transmitting element replaces the push rod element in the line of force transmission, the force indicator cell being removed from the line.

The purpose of this is to enable the lock to be calibrated to be preliminarily cycled at its detent for a few strokes to insure that it is free and non-binding working order. When this has been observed to be the case, the carriage of the force indicator cell sub-assembly is swung back into the housing, returning the cell to the line of force transmission.

In accordance with the invention, the cell carriage is releasably held in either the last-named position or in the cycling position by means of a releasable push button device. A spring urged pin of this device takes radially into one or the other of two elongated, axially extending slots of a sleeve and guide bar detail, by which the cell-carriage sub-assembly is guided for longitudinal movement, so that the sub-assembly is stabilized against swing during this movement.

It is a further object of the invention to provide a calibrator device of the type described which further includes a very accurately calibrated master gauge or cell unit enabling a visual comparison of a reading of the dial of this unit with the reading of the dial of the force indicator cell unit. The master gauge is an instrument very closely resembling the force indicator cell, and is mounted in the force transmission line through the latter. It receives force applied through the cell at a push member of the master which abuts the lock detent-receiving cage of the calibrator. The master gauge has provision to readily and easily apply it to an end wall of the housing of the device, and to remove it for storage when not in use, which will ordinarily be quite infrequent.

A further and more specific object of the invention is to provide lock calibrator or like equipment as described which is largely made up of components which are readily and cheaply produced, as by screw machine operations or, as in the case of certain bearing block members, are of a standardized and simple design; and in which the means for assembling the components of the calibrator to one another and to the housing of the calibrator are also simple in nature and are thus assembled in a fast and easy way.

The foregoing, as well as other objects, will become more apparent as this description proceeds, especially when considered in connection with the accompanying drawings illustrating the invention, wherein.

Figure 1:
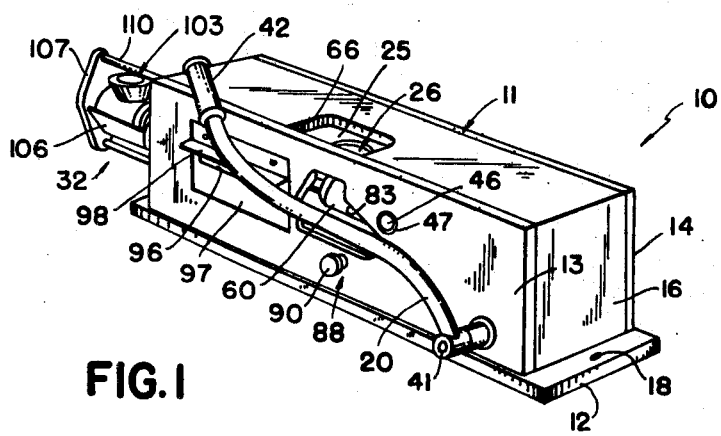
FIG. 1 is a perspective view of the calibrator, showing the general relationship of some of the major components thereof to one another.
Figure 2:
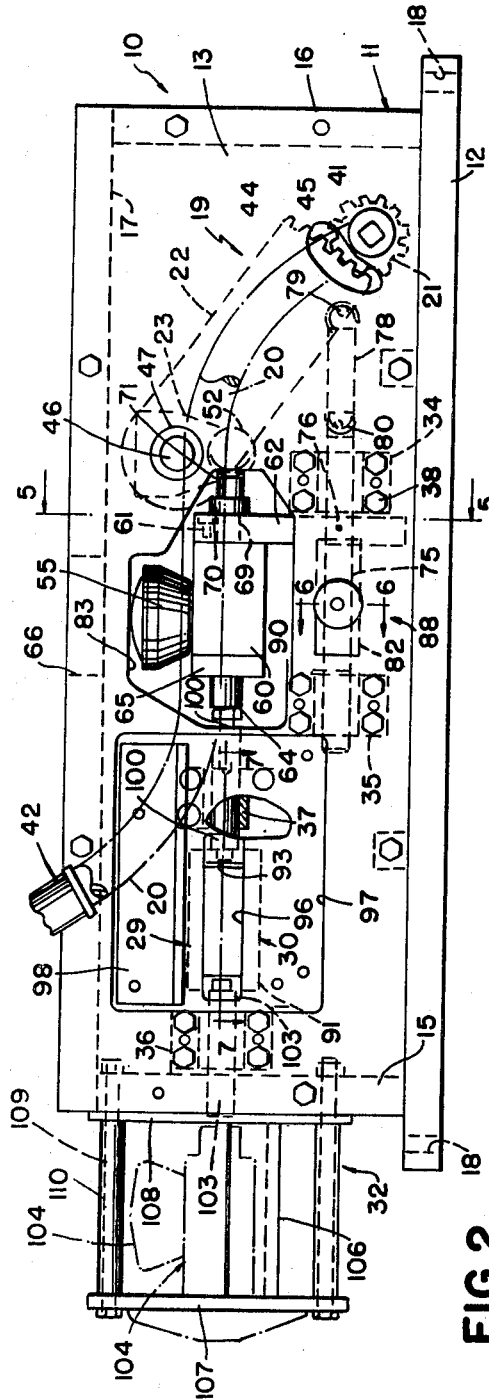
FIG. 2 is a view of the equipment in side elevation, a front wall of its housing being partially broken away to more clearly show certain power input pinion and gear means, a guided cell carriage unit, etc.
Figure 3:
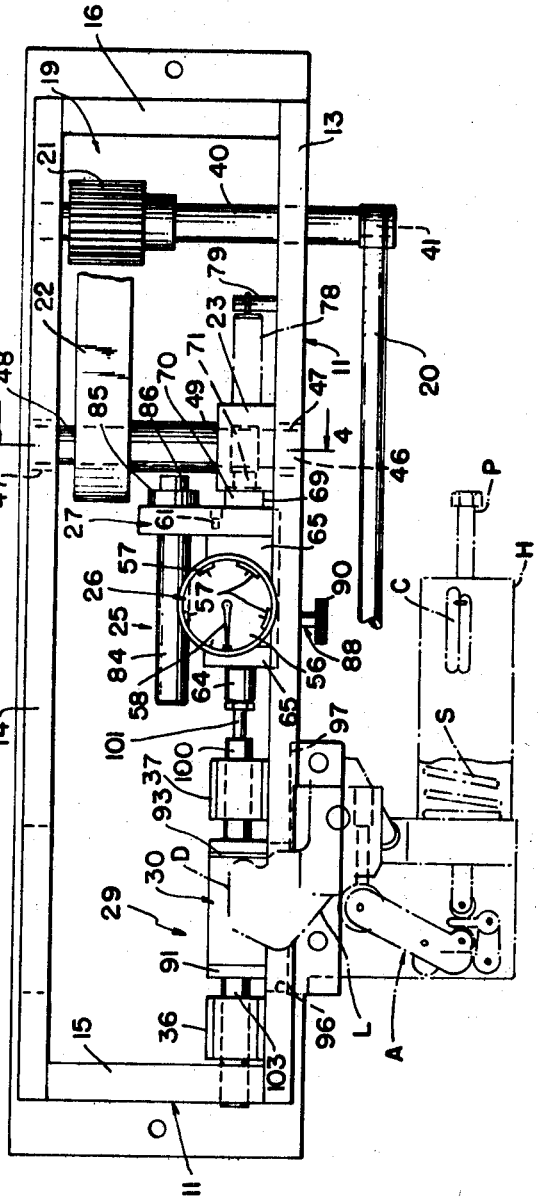
FIG. 3 is a top plan view, partially broken away, of the calibrator device, with an upper, cover plate thereof removed, this view also showing in dot-dash line a typical right-hand lock bolted for calibration to a side wall of the housing, with the lock's detent received in the force receiving cage of the device.

In general, reference being had to FIGS. 1, 2 and 3, the calibrator of the invention, general designated by the reference numeral 10, comprises an elongated rectangular, box-like housing 11, preferably of aluminum or other light-weight metal. Typically, this housing will comprise an elongated rectangular base or bottom plate 12, upright elongated front and rear side walls 13, 14, respectively, upright end walls 15, 16 and a top cover plate 17, all of relatively thick and sturdy cross section, since housing 10 receives and absorbs the heavy forces involved in the calibrating operation. If desired, base plate 12 may be provided with end bolt holes 18 to mount the same to an appropriate table or stand (not shown), although this, again, is not necessary inasmuch as housing 11 is self-sustaining as to stress.

The housing serves as a support for a force multiplying and applying unit or sub-assembly 19, which is generally comprised of a hand operated power input crank 20 external of housing wall 13, which drives a pinion 21, the pinion in turn driving an elongated sector gear 22, which gear coacts in the manner of the long arm of a bell crank (as will be described), which a short, force applying output arm 23; a force indicator cell and carriage unit, generally designated 25, including a conventional indicator cell 26 proper and a special arm 27 on which the cell is mounted; a cage unit or sub-assembly 29, including a cage 30 proper which is movable in the line of force transmission through force applying output arm 23 and indicator cell 26; and (FIGS. 1 and 2), a master gauge or cell unit or sub-assembly 32. Longitudinally sliding components of the sub-assemblies referred to above are received in and stably guided by standard bearing blocks 34, 35, 36 and 37, all strongly secured by machine bolts 38 to the inner side of the front wall 13 of housing 11.

Figure 4:
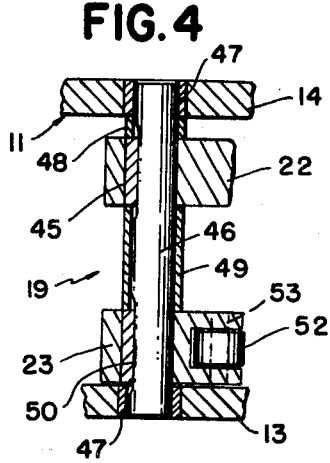
FIG. 4 is a fragmentary view in vertical section on line 4—4 of FIG. 3, illustrating certain components of a bell crank type of force multiplying and applying subassembly of the calibrator.

As best shown in FIGS. 2, 3 and 4, the power or force input pinion 21 of the force multiplying and applying sub-assembly 19 is keyed or otherwise fixedly secured to an input shaft 40 extending transversely between appropriate journals in the housing side walls 13, 14; and the hand crank 20 is spline-connected to a reduced diameter end portion 41 of shaft 40 external of the front housing wall 13.

Suitable bushing and spacer means (of a type later described in reference to a power output shaft) may be associated with input shaft 40 and pinion 21. As appears in FIGS. 1 and 2, crank 20 is considerably elongated and of a curved outline, so as to be compactly positioned along the side of housing 11 when the crank is swung fully to the left. It is provided with a rubber hand grip 42 at its free extremity.

The force transmitting sector gear 22 is in the form of an elongated plate-like arm having gear teeth 44 meshing with teeth 45 of pinion 21. The opposite end of gear 22 is key-connected at 45 (FIG. 4) to a transversely extending output shaft 46, which shaft is journaled by bushings 47 in the respective front and rear side walls 13, 14 of housing 11, with a short annular spacer 48 interposed between sector gear 22 and wall 14.

Another and more elongated spacer sleeve 49 surrounding output shaft 46 separates gear 22 from the shorter output and force applying arm 23 of unit 19, arm 23 being keyed at 50 to shaft 46. Accordingly, sector gear 22 and arm 23, as unitarily coupled drivingly to shaft 46, in effect constitute a bell crank contributing considerable mechanical advantage in the amplification or multiplication of force transmitted at the arm 23. This force is further multiplied at the meshing gear and pinion teeth 44, 45 and, finally, by the moment arm distance from grip 42 of crank 20 to the axis of the latter. Accordingly, a nominal manual input effort of, say, 50–60 pounds applied at crank grip 42 is exerted as an output force along the line of force transmission in the much magnified values of 250–4,000 lbs. mentioned above. The multiplied force is directly transmitted at the output through the agency of a small hardened anti-friction roller 52 journaled by a pin 53 in a clevis space at the outer end of arm 23.

In regard to the force indicator cell and carriage unit or sub-assembly 25, reference being had to FIGS. 2 and 3, its cell 26 proper is a conventional indicator instrument of a type manufactured by Force Controls Co. of Detroit, Mich., and designated its Model 204S. It suffices for the purposes of the present description to state that cell 26 comprises an inverted frusto-conical, glass covered casing 55 enclosing a dial 56 which has calibration indicia 57 of progressively increasing arcuate extent. These dial markings correspond to the different force-range tolerances mentioned above. An indicator needle 58 of cell 26 coacts with the indicia 57; and it will be understood that if the detent D of a particular lock L (FIG. 3) yields at a given force value as observed on dial 56, for which that lock is set (or within the tolerance of the particular setting), then the lock in question is in proper calibration. Otherwise, a simple adjustment of the lock is in order, and it can ordinarily be performed while the lock is still on calibrator 10. The general nature of the lock construction and its adjustment means will be hereinafter described in somewhat greater detail.

For the rest, force indicator cell 26 comprises a body member 60 upon which its dial casing 55 is mounted, the body 60 being rigidly secured by bolts 61 to an upright, plate-like arm 62 of the carriage component 27 of cell and carriage sub-assembly 25.

A conventional plunger 64 of force indicator cell 26 projects through an end plate 65 of the body 60; and in the typical operation of cell 26 an inward movement of plunger rod 64 relative to the cell body under compression is transmitted to indicator pointer 58 as a function of the force transmitted to cage 30 from the output roller 52 of the force-originating sub-assembly 19. The force indication on the dial 56 of cell 26 may be observed through an opening 66 in top plate 17 of the housing 11.

Figure 5:
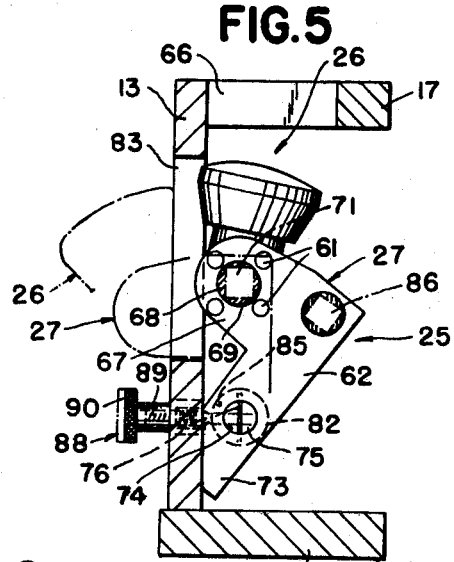
FIG. 5 is a view in vertical section on line 5—5 of FIG. 2, illustrating a cell-carriage unit or subassembly of the device, the unit being shown in solid line in its operative position for the normal calibrating operation, and with a dot-dash line indication of its position as swung outwardly for a preliminary cycling of the lock to be calibrated.

The cell carriage arm 62 is in the line of force transmission, and as illustrated in FIGS. 2 and 5, arm 62 is of generally L-shaped cross section. An upper offset portion 67 thereof receives the bolts 61 by which indicator cell 26 is attached thereto; and this portion has a cylindrical through opening 68 which receives the inner shank portion 69 of a relatively short push button tappet member 69. The latter is suitably restrained against rotation and has an enlarged intermediate shoulder portion 70 which abuts the outer face of carriage arm 62, as well as an end tappet portion 71 of square cross section. Portion 71 is directly engaged by the force applying roller 52, thus to shift the entire cell and carriage unit 25 to shift to the left, as viewed in FIGS. 2 and 3, as force applied to tappet member 69 and arm 26 is progressively increased.

Figure 6:
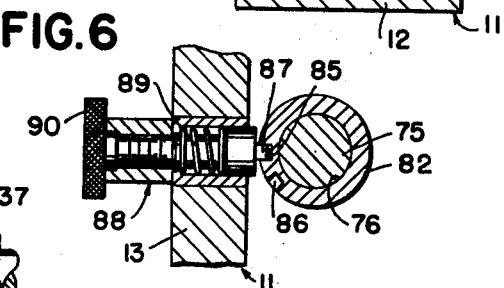
FIG. 6 is a view in transverse vertical section on line 6—6 of FIG. 2, showing in somewhat enlarged scale the releasable, anti-swing holding and guiding provisions for the cell-carriage sub-assembly.

Reference being had to FIG. 6 in conjunction with FIGS. 2 and 3, in order to slidably guide the unit 25 for this axial shift movement, as well as to journal it for an optional limited swing in a vertical plane at 90° to the line of shift, the lower offset portion 73 of carriage arm 62 is provided with a cylindrical through-opening 74 (FIG. 5) which receives an elongated guide rod or bar 75; and a pin 76 fixedly secures bar 75 to the said offset portion 73 of carriage arm 62.

The guide bar 75 is slidably guided with rather close radial clearance in the bearing blocks 34 and 35 bolted to front housing side wall 13, and a coil tension spring 78 (FIG. 2), anchored at one end by a pin 79 on housing wall 13, connects at its opposite end at 80 to the right-hand end of bar 75. Thus the entire cell and carriage assembly 25 is biased to the right and its push button tappet member is held against roller 52 of the output arm 23 of force multiplying and applying unit 19.

As appears in FIGS. 3 and 6, the lower portion 73 of carriage arm 62 is recessed on its left-hand side to receive a tubular carriage guide and restraint sleeve 82, which sleeve is welded or otherwise fixedly secured in this zone to arm 62. Hence the sleeve 82 moves as a unit with the carriage arm and guide bar 75 in either the axial or the rotative direction, for a purpose to be described.

That is, it may be, and usually is, found desirable to cycle the lock L for a certain number of release operations, prior to actual calibration, in order to insure that the lock is in free and non-binding, working condition. With this in mind, it is also desirable that the entire cell and carriage sub-assembly 25 may be swung outwardly, as through a relatively large, specially shaped opening 83 in housing wall 13, i.e., from the solid line portion of FIG. 5 to the dot-dash line position, and that a rigid line of force transmission to cage 30, but omitting the force indicator cell 26, may then be established at this last-named position.

To this end, the carriage arm 62 of unit 25 non-rotatively receives an elongated push rod 84, which has an enlarged intermediate shoulder 85 abutting arm 62 and an end tappet portion 86, both of the same axial length as the corresponding portions 70 and 71 of the tappet member 69 which normally occupies the line of force transmission through indicator cell 26, as appears in FIG. 5. Accordingly, as swung to the dot-dash position of FIG. 5, carriage unit 27 transmits force through push rod 84 to cage 30 for pre-cycling as described above.

In this connection, and as best depicted in FIG. 6, provision is made to releasably restrain the carriage arm 62 and associated components from rotation away from either of the positions referred to, while permitting the desired axial shift. Thus, the restraint sleeve 82 is provided with a pair of parallel, elongated and circumferentially spaced grooves 85, 86 either one of which is adapted to receive device 88 mounted to housing wall 13. The pin 87 is biased by a spring 89 in the direction radially inwardly of sleeve 82. Thus, pin 87 may be manually retracted by a release knob or finger piece 90 from one of the grooves 85, 86 to permit a slight swing of the cell-carriage unit 25 about the axis of the sleeve 82 and guide bar 75, and replacement of pin 87 in the other groove. This arrangement holds the unit 25 against swing from either of the rotatively adjusted positions, while still permitting the desired axial shift of unit 25 under force exerted by the multiplying and applying unit 19.

Figure 7:
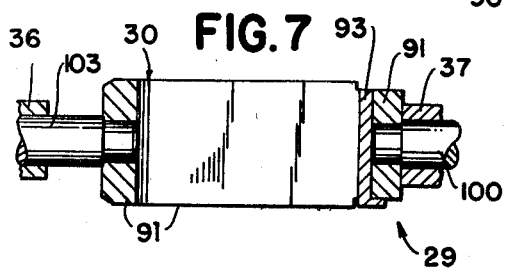
FIG. 7 is a horizontal sectional view on line 7—7 of FIG. 2, showing features of the detent receiving carriage of the calibrator.

The cage 30 proper of unit 29, as best shown in FIG. 7, includes a box-like body 91, which has limited sliding movement along the inner side of front housing wall 13, and a hardened wear plate 93 which is fixedly carried adjacent the right-hand end of the cage, directly behind a horizontally elongated opening 96 in wall 13. It is through this opening that the detent D of lock L projects into the cage body 91, to be acted upon by the wear plate 93 of the cage.

For the purpose of mounting the lock L in the desired position on housing 11, wall 13 is recessed at 97 to receive the lock, and the recess 97 may be fitted with an appropriate adapter angle 98 adjacent its top, the adapter angle and wall recess 97 having appropriate openings to receive bolts or screws for the fastening of the angle to the wall and the mounting of the lock L to the wall and/or angle. It is contemplated, however, that different models of the lock may be mounted in different ways.

Cage 30 is actuated from the right by a push rod 100 having a reduced portion fitted into the right-hand end (FIGS. 2 and 3) of cage body 91; and rod 100 is guided in the wall-mounted bearing block 37. It in turn has threaded into its right-hand end an adjustable tappet screw 101, which screw is abutted by the compressibly movable plunger 64 of the force indicator cell 26, as appears in FIGS. 2 and 3.

The opposite, left-hand end of cage 30 abuts rearwardly against a still further push rod 103 slidably guided in the bearing block 36. Thus there is a single line of force transmission from the actuator roller 52 of unit 19 through the tappet member 69, carriage arm 62, indicator cell body 60, plunger 64 of the latter, tappet screw 101, push rod 100, cage 30 and push rod 103.

The left-hand end (FIGS. 2 and 3) of push rod 103 will extend through an appropriately located opening in the left-hand end wall 15 of housing 11, for coaction with the master gauge unit 32. The gauge or cell of this unit is generally designated 104, and it is supported in an angle-shaped cradle 106 of the gauge unit. The mounting means for the gauge may further comprise apertured end plates 107, 108 with elongated bolts or studs 109 extending through these plates and tubular spacers 110 for the latter, thus to mount master gauge 103 rigidly to calibrator housing 11. As indicated above, the master gauge unit or sub-assembly is infrequently used, perhaps only semi-annually, and it is preferably removed from housing 11 during these intervals of non-use, for storage and protection.

Referring to FIG. 3, the right-hand, parachute release lock L appearing in dot-dash line therein includes a housing H encasing an elongated spring S, and a pre-compression and adjustment screw P is threaded into the end of housing H, enabling the resistive force opposing parachute release drag to be adjusted as desired, as indicated by a small pointer coacting with a load indicating calibrated member M adjacent an elongated opening in the housing wall. The reference numeral A generally designates an assembly of coacting force transmitting parts of the lock L. Through the agency of this assembly, a force, simulating a parachute retraction or drag force, as applied by cage unit 29 to the detent D of lock L, is transmitted to the resistive, pre-compressed spring S; and the detent D should yield counter-clockwise (FIG. 3) under a pre-determined load force, as determined by the value at which the spring is pre-set by the manipulation of pre-compression screw P. This value will be initially set up for any given one of the 250–4,000 lbs. pallet-restraint forces under which lock L may operate. Further illustration and description of the right-hand lock L are set out in detail in the Mollon et al. application, Ser. No. 282,008, identified above.

In the use of calibrator 10, the lock L is mounted in the front wall recess 97 of housing 11 and bolt-secured thereto with the assistance of the angled adapter member 98, with detent D of the lock received in cage 30. With the force indicator cell sub-assembly 25 swung to the dot-dash line position of FIG. 5, and held against rotation from that position by the engagement of pin 87 of the release unit 88 (FIG. 6) in the groove 85 of sleeve 82 of carriage plate 27, the operating hand crank 20 is given, say 6–8 strokes in the counter-clockwise direction (FIGS. 1 and 2), and back. This is for the purpose of cycling lock L as mentioned above, with force transmitted through the push rod 84 of sub-assembly 25, rather than through the indicator cell 26 of the latter. In this preliminary cycling operation, care should be taken that detent D is not subjected to the critical force which will cause it to release.

After cycling, the cell and carriage unit 25 is returned clockwise (FIG. 5) to the position thereof shown in solid line in that figure; and the calibrating operation then proceeds. For each setting of the resistive force of pre-compression spring S, the operator applies a steady counter-clockwise force on crank 20, and carefully observes the reading on the dial 56 of cell 26 when the lock detent D is caused to snap to a release position, as opposed by spring force exerted through force transmission assembly A. Any necessary correction when the force exceeds the desired tolerance range is then taken care of by manipulation of pre-compression adjusting screw P.

It is evident that the manipulation factor on applied force originating at the hand crank 20 is great, by reason of the mechanical advantages contributed by the moment arm length of crank 20, pinion 21 and sector gear 22 and bell crank advantage represented by the longer and shorter lengths of gear 22 and output arm 23.

As mentioned above, calibrator 10 is periodically checked as to the accuracy of its force indicator cell 26 by recourse to the use of the master gauge unit 32.

What is claimed is:

1. Equipment for calibrating or similarly treating a mechanism, comprising means operable to originate and apply a force along a rectilinear force transmission line, a support having means to mount thereon a mechanism to be treated at an operated member of the mechanism, and means operatively positioned in relation to said force transmission line to establish a force transmitting connection from said originating and applying means to said operated member of said mechanism, said connection-establishing means including a unit having a force transmitting part in said transmission line and being operable, in response to force exerted on said part, to give an indication related to the transmitted force said equipment further comprising another unit having means in said force transmission line to apply said transmitted force to said operated member of the treated mechanism, the force along said line being applied from said originating and applying means through said indication-giving unit to said other unit and said member, said support which mounts the treated mechanism comprising a wall having an opening through which said operating member extends; said other unit comprising a cage receiving said member and adapted to apply the transmitted force thereto; and said indication-giving unit comprising an instrument having an indicator movably responsive to the transmitted force, and calibrated indicia coacting with said indicator.

2. Equipment for calibrating or similarly treating a mechanism, comprising means operable to originate and apply a force along a rectilinear force transmission line, a support having means to mount thereon a mechanism to be treated at an operated member of the mechanism, and means operatively positioned in relation to said force transmission line to establish a force transmitting connection from said originating and applying means to said operated member of said mechanism, said connection-establishing means including a unit having a force transmitting part in said transmission line and being operable, in response to force exerted on said part, to give an indication related to the transmitted force, said equipment further comprising another unit having means in said force transmission line to apply said transmitted force to said operated member of the treated mechanism, the force along said line being applied from said originating and applying means through said indication-giving unit to said other unit and said member, said support which mounts the treated mechanism comprising a wall having an opening through which said operating member extends; said other unit comprising a cage receiving said member and adapted to apply the transmitted force thereto; said indication-giving unit comprising an instrument having an indicator movably responsive to the transmitted force, and calibrated indicia coacting with said indicator, said force originating and applying means comprising a mechanical force multiplying linkage including an operating crank, a pinion driven by said crank, gear teeth driven by said pinion, and bell crank means driven by said gear teeth, said bell crank means having a relatively short output arm applying force to said indication-giving unit.

3. Equipment for calibrating or similarly treating a mechanism, comprising means operable to originate and apply a force along a rectilinear force transmission line, a support having means to mount thereon a mechanism to be treated at an operated member of the mechanism, and means operatively positioned in relation to said force transmission line to establish a force transmitting connection from said originating and applying means to said operated member of said mechanism, said connection-establishing means including a unit having a force transmitting part in said transmission line and being operable, in response to force exerted on said part, to give an indication related to the transmitted force, said indication-giving unit being provided, in addition to said part thereof, with a further force transmitting part, said unit being selectively movable to place one or the other of said parts in said force transmitting line.

4. Equipment for calibrating or similarly treating a mechanism, comprising means operable to originate and apply a force along a rectilinear force transmission line, a support having means to mount thereon a mechanism to be treated at an operated member of the mechanism, and means operatively positioned in relation to said force transmission line to establish a force transmitting connection from said originating and applying means to said operated member of said mechanism, said connection-establishing means including a unit having a force transmitting part in said transmission line and being operable, in response to force exerted on said part, to give an indication related to the transmitted force, said support which mounts the treated mechanism comprising a wall having an opening through which said operating member extends; said indication-giving unit comprising an instrument having an indicator movably responsive to the transmitted force, and calibrated indicia coacting with said indicator, said indication-giving unit being provided, in addition to said part thereof, with a further force transmitting part, said unit being selectively movable to place one or the other of said parts in said force transmitting line.

5. The equipment of claim 2, in which said indication-giving unit is provided, in addition to said part thereof, with a further force transmitting part, said unit being selectively movable to place one or the other of said parts in said force transmitting line.

6. Equipment for calibrating or similarly treating a mechanism, comprising means operable to originate and apply a force along a rectilinear force transmission line, a support having means to mount thereon a mechanism to be treated at an operated member of the mechanism, and means operatively positioned in relation to said force transmission line to establish a force transmitting connection from said originating and applying means to said operated member of said mechanism, said connection-establishing means including a unit having a force transmitting part in said transmission line and being operable, in response to force exerted on said part, to give an indication related to the transmitted force, said equipment further comprising a second indication-giving unit having means to mount a part thereof in said force transmitting line, said second unit being operable in response to force transmitted to said part thereof along said line.

7. Equipment for calibrating or similarly treating a mechanism, comprising means operable to originate and apply a force along a rectilinear force transmission line, a support having means to mount thereon a mechanism to be treated at an operated member of the mechanism, and means operatively positioned in relation to said force transmission line to establish a force transmitting connection from said originating and applying means to said operated member of said mechanism, said connection-establishing means including a unit having a force transmitting part in said transmission line and being operable, in response to force exerted on said part, to give an indication related to the transmitted force, said support which mounts the treated mechanism comprising a wall having an opening through which said operating member extends; said indication-giving unit comprising an instrument having an indicator movably responsive to the transmitted force, and calibrated indicia coacting with said indicator, said equipment further comprising a second indication-giving unit having means to mount a part thereof in said force transmitting line, said second unit being operable in response to force transmitted to said part thereof along said line.

8. The equipment of claim 2, and further comprising a second indication-giving unit having means to mount a part thereof in said force transmitting line, said second unit being operable in response to force transmitted to said part thereof along said line.

9. Equipment for calibrating an aircraft lock characterized by a housing and a spring-biased detent projecting from and movable relative to the housing, comprising means operable to originate and apply a force directly upon said detent along a force transmission line opposing the detent bias, a plate having means to fixedly mount said housing at one side of said line and an opening through which said detent projects into said line, and means operatively positioned in relation to said force transmission line to establish a direct force transmitting connection along said line from said originating and applying means to said detent, said connection-establishing means including a unit having a force transmitting part acting directly and rigidly in and along said transmission line, an indicator operable, in response to force exerted on said part, to give an indication related to the transmitted force, and a cage in said line engaging said detent and transmitting the last named force to the detent.

References Cited
UNITED STATES PATENTS 2,754,680 7/1956 Koehler _____ 73—95
3,222,922 12/1965 Issac _____ 73—133

S. CLEMENT SWISHER, Primary Examiner

U.S. Cl. X.R.

73—88